US010257121B1

(12) United States Patent
Qin et al.

(10) Patent No.: US 10,257,121 B1
(45) Date of Patent: Apr. 9, 2019

(54) FULL-RATE TRANSMITTER

(71) Applicant: Oracle International Corporation, Redwood City, CA (US)

(72) Inventors: Zuxu Qin, Stanford, CA (US); Baoqing Huang, Redwood City, CA (US); Dawei Huang, San Diego, CA (US); Kuai Yin, Milpitas, CA (US); Maoqing Yao, Fremont, CA (US); Philip Kwan, Blossom Valley, CA (US)

(73) Assignee: Oracle International Corporation, Redwood City, CA (US)

( * ) Notice: Subject to any disclaimer, the term of this patent is extended or adjusted under 35 U.S.C. 154(b) by 47 days.

(21) Appl. No.: 15/722,349

(22) Filed: Oct. 2, 2017

(51) Int. Cl.
*H04L 9/06* (2006.01)
*B23P 19/04* (2006.01)
*H04L 12/935* (2013.01)

(52) U.S. Cl.
CPC .............. *H04L 49/30* (2013.01); *B23P 19/04* (2013.01); *H04L 9/065* (2013.01)

(58) Field of Classification Search
CPC ......... H04L 49/00; H04L 49/30; H04L 9/065; H04L 47/30; H04L 67/1097; H04B 1/04; H04B 1/16; H04B 1/0475; H04B 10/25; H04B 10/40; H04W 88/181
See application file for complete search history.

(56) References Cited

U.S. PATENT DOCUMENTS

| 6,078,809 A * | 6/2000 | Proctor ................. H04M 3/56 455/416 |
| 9,231,752 B1 * | 1/2016 | Yan ........................ H04L 7/0016 |
| 9,544,015 B2 * | 1/2017 | Ulrich ...................... H04B 3/04 |
| 10,084,591 B1 * | 9/2018 | Palusa .................... H04L 7/0025 |
| 2004/0136411 A1 * | 7/2004 | Hornbuckle ........... H04J 3/047 370/537 |

(Continued)

OTHER PUBLICATIONS

Mujica, Fernando A., et al., "SNR Estimation for a Reduced-rate Receiver Communicating with a Full-rate Transmitter in the Context of DMT Modulation," Communications Systems Laboratory, DSP Research & Development Center, Texas Instruments Incorporated, Nov. 1, 2000, pp. 1-6. (Year: 2000).*

(Continued)

*Primary Examiner* — Afsar M Qureshi
(74) *Attorney, Agent, or Firm* — Marsh Fischmann & Breyfogle LLP; Jonathon A. Szumny

(57) ABSTRACT

Embodiments include systems and methods for transmitting data over high-speed data channels in context of serializer/deserializer circuits. Some embodiments include a novel full-rate source-series-terminated (SST) transmitter driver architecture with output charge sharing isolation. Certain implementations have a programmable floating tap (e.g., in addition to standard taps) with both positive and negative FIR values and cursor reduction, which can help achieve large FIR range and high channel equalization capability. Some embodiments operate with multi-phase clocking having phased clock error correction, which can facilitate operation with low-jitter and low-DCD clocks. Some implementations also include novel output inductor structures that are disposed to partially overlap output interface bumps.

20 Claims, 6 Drawing Sheets

(56) References Cited

U.S. PATENT DOCUMENTS

| | | | |
|---|---|---|---|
| 2009/0074407 A1* | 3/2009 | Hornbuckle | H04B 10/532 398/43 |
| 2013/0007500 A1* | 1/2013 | Fiedler | G06F 1/10 713/501 |
| 2016/0218896 A1* | 7/2016 | Fiedler | H03K 19/0005 |
| 2017/0085361 A1* | 3/2017 | Hood | H03K 5/135 |
| 2017/0279533 A1* | 9/2017 | Elahmadi | H04B 10/40 |

OTHER PUBLICATIONS

Ackson, Al, "ADSL for High-Speed Broadband Data Service," 1998 IEEE 0-7803-4311, pp. 451-465 (Year: 1998).*

* cited by examiner

FULL-RATE TRANSMITTER

FIELD

Embodiments relate generally to transmitter circuits, and, more particularly, to high-speed, full-rate transmitter drivers, for example, having multi-tap, multi-phase, source-series-terminated (SST) configurations.

BACKGROUND

Many modern electronics applications use high-performance central processing units (CPUs). In such contexts, achieving high performance can rely on obtaining high data bandwidth from the CPU. Typically, design constraints on CPUs have limited increases in physical size and pin count of CPUs. Accordingly, meeting ever-increasing demands for data bandwidth has involved designing CPUs with ever-increasing input/output (I/O) data rates. As an example, the Infini-band Enhanced Data Rate standard (IB EDR) exceeds 25 Gigabits per second.

Achieving such I/O data rate increases can be difficult. For example, each I/O location (e.g., pin) on the CPU can have a serializer/deserializer (SERDES) with a receiver and a transmitter, and increasing the I/O data rate can rely on increasing the SERDES operating speed. The SERDES transmitter typically includes a transmitter driver that prepares output data for transmission over a high-speed channel. Effective operation of a transmitter driver at high data rates can depend on the driver continuing to meet high performance requirements, such as high bandwidth, high finite impulse response (FIR) range, fine resolution, low jitter, and low duty cycle distortion (DCD).

BRIEF SUMMARY

Among other things, embodiments provide systems and methods for transmitting data over high-speed data channels in context of serializer/deserializer circuits. Some embodiments include a novel full-rate source-series-terminated (SST) transmitter driver architecture with output charge sharing isolation. Certain implementations have a programmable floating tap (e.g., in addition to standard taps) with both positive and negative FIR values and cursor reduction, which can help achieve large FIR range and high channel equalization capability. Some embodiments operate with multi-phase clocking having phased clock error correction, which can facilitate operation with low-jitter and low-DCD clocks. Some implementations also include novel output inductor structures that are disposed to partially overlap output interface bumps.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
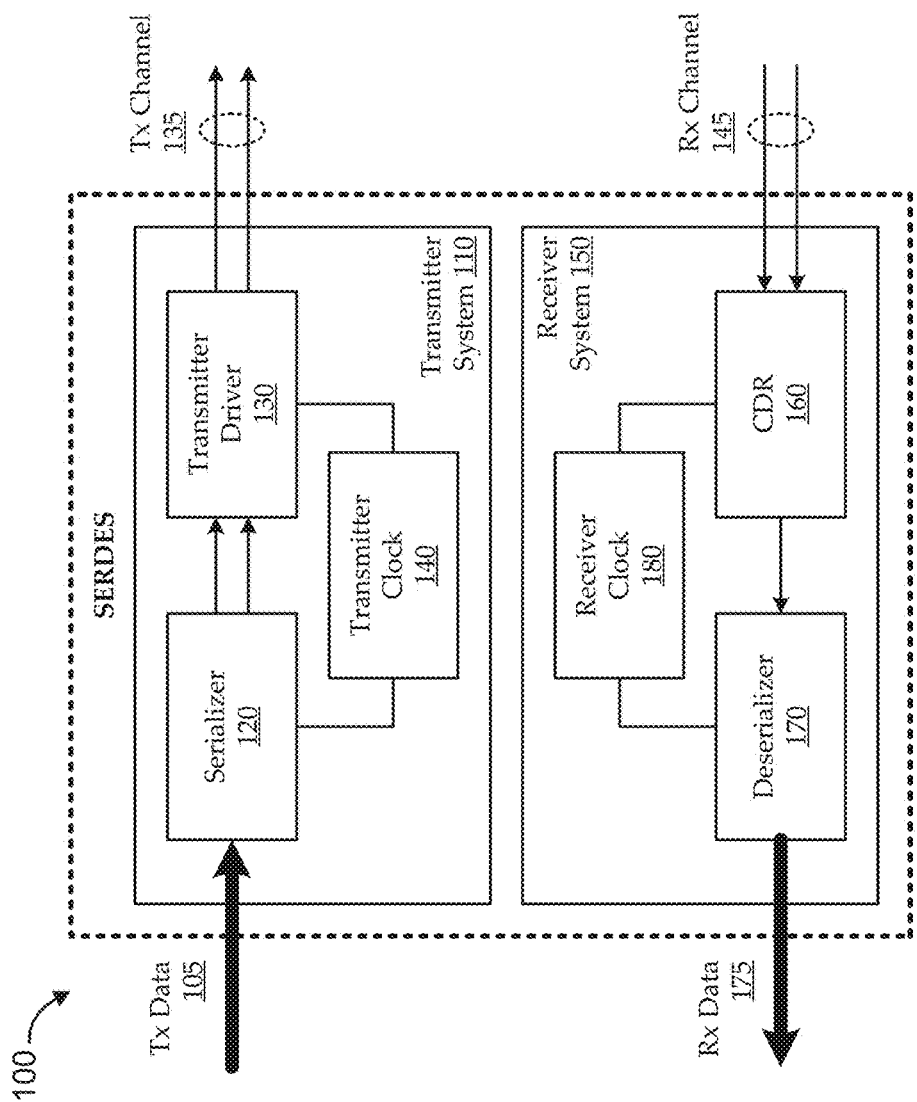
FIG. 1 shows a simplified block diagram is shown of an illustrative serializer/deserializer (SERDES), as a context for various embodiments.

Turning first to FIG. 1, a simplified block diagram is shown of an illustrative serializer/deserializer (SERDES) 100, as a context for various embodiments. For example, though not shown, the SERDES can be implemented in context of an input/output (I/O) interface (e.g., a pin, etc.) of an integrated circuit (IC), such as a high-performance central processing unit (CPU). The SERDES 100 includes a transmitter system 110 and a receiver system 150. The transmitter system 110 can include a serializer 120 and a transmitter driver 130, both operating in context of a transmitter clock 140. Generally, the serializer 120 receives parallel transmit data 105 from components of the IC and converts the parallel transmit data 105 to serial data (e.g., differential data). The transmitter driver 130 can receive the serialized data and can prepare the data for transmission over a transmit channel 135 of a high-speed serial link (e.g., a data bus). The receiver system 150 can include a clock data recovery (CDR) circuit 160 and a deserializer 170, both operating in context of a receiver clock 180. Generally, the CDR circuit 160 receives serial data from a receive channel 145 of the high-speed serial link and recovers data symbols and clock information. The recovered stream of data can be received by the deserializer 170, which can convert the data into parallel receive data 175 for use by components of the IC.

While the transmitter system 110 and the receiver system 150 are illustrated as simplified functional block diagrams to avoid overcomplicating the description and figures, these simplifications should not be construed as limiting embodiments and implementations. The systems can include fewer or additional components, and the various functional blocks can each be implemented as one or more discrete components, combined with other functional blocks into a single component, implemented in any suitable architecture or arrangement, etc. For example, though not explicitly shown, the transmitter system 110 and/or the receiver system 150 can include amplifiers, filters, equalizers, interface components, and/or any other suitable components for converting the between parallel IC data and serial channel data.

In many high-performance CPUs, high bandwidth is achieved at least partially by increasing I/O data rates. Increasing I/O data rates can involve increasing SERDES 100 operating speeds, which includes increasing the operating speeds of the receiver system 150 and the transmitter system 110. Reliable operation of the SERDES 100 at high data rates can rely on the design meeting high performance characteristics. For example, it can be desirable for the transmitter system 110 to achieve high bandwidth, high finite impulse response (FIR) range, fine resolution, low jitter, low duty cycle distortion (DCD), and other high performance characteristics.

Embodiments described herein focus on novel designs for the transmitter driver 130 that achieve high performance characteristics at high data rates. For example, some embodiments can operate at least according to the Infiniband Enhanced Data Rate standard (approximately 25.78125 Gigabits per second). Embodiments can include various features. Some embodiments include a source-series-terminated (SST) transmitter driver architecture that has a floating tap. The floating tap can be in addition to other taps (e.g., in addition to an industry standard 3-tap FIR) with both positive and negative FIR values and cursor reduction, which can help achieve large FIR range and high channel equalization capability. Some embodiments can also include optimization of FIR slices (e.g., 16 slices), which can improve the clock tree, power-to-area tradeoff, FIR range, and FIR resolution. Embodiments can be implemented as a full-rate transmitter driver 130, which can yield better impedance control and serializer 120 charge sharing isolation with respect to the output. Further, embodiments can operate with four-phase clocking having quadrature error correction, which can facilitate operation with low-jitter and low-DCD clocks and compatibility with clocking structures based on low-power ring voltage controlled oscillator (VCOs) at data rates up to approximately 20 Gigabits per second.

Figure 2:
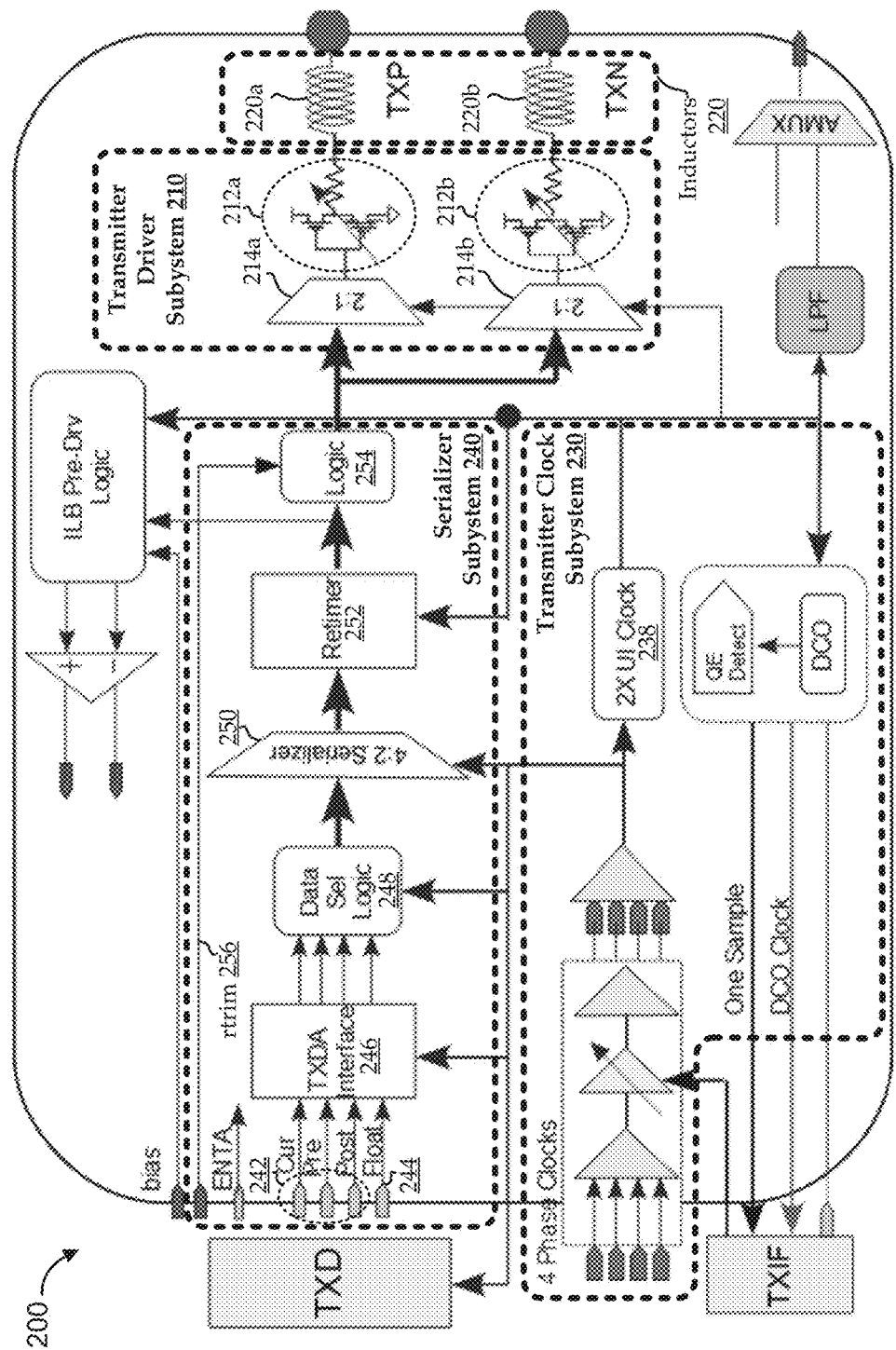
FIG. 2 shows a circuit diagram for an illustrative transmitter system, according to various embodiments.

FIG. 2 shows a circuit diagram for an illustrative transmitter system 200, according to various embodiments. The transmitter system 200 can be an implementation of the transmitter system 110 of FIG. 1. For the sake of simplicity, components of the transmitter system 200 are grouped into blocks including a transmitter driver subsystem 210, a transmitter clock subsystem 230, and a serializer subsystem 240. The transmitter driver subsystem 210, transmitter clock subsystem 230, and serializer subsystem 240 can be implementations of the transmitter driver 130, transmitter clock 140, and serializer 120 of FIG. 1. The particular component groupings are intended only to help clarify the description, and should not be construed as limiting potential alternative implementations. For example, some components grouped as part of the serializer subsystem 240 may more appropriately be considered components of a pre-driver, a feed-forward filter (e.g., a FIR filter, or the like), etc. Further, the description herein focuses on relevant portions of the circuit.

As illustrated, the transmitter driver subsystem 210 is implemented as a source-series-terminated (SST) architecture, however some techniques described herein can be applied to other architectures. For example, transmitter driver subsystems 210 are typically implemented according to three categories of architecture: SST architectures, current-mode logic (CML) architectures, and H-bridge architectures. CML and H-bridge architectures typically consume more power than SST architectures (CML tends to be higher than H-bridge). Also, SST architectures tend to have better return loss characteristics (CML tends to have less return loss than H-bridge). Further, SST architectures typically manifest smaller capacitive loads and parasitics at their outputs with better electrostatic discharge (ESD) performance.

The illustrated transmitter driver subsystem 210 is a full-rate driver. For example, the each SST portion 212 of the transmitter driver subsystem 210 is implemented after a respective multiplexer portion 214. For the sake of simplicity, each SST portion 212 of the transmitter driver subsystem 210 is effectively illustrated as an inverter coupled in series with an output resistor. Also, to avoid overcomplicating the illustration, only a single driver slice is shown. For example, the transmitter driver subsystem 210 can include a number of driver paths (e.g., branches, slices, etc.) that operate in parallel.

As described further below, one complication of high-speed, high-bandwidth SERDES design can be implementing on-die inductors 220 to boost power performance. Design constraints typically result in a tradeoff between power and area. For example, while it can be desirable to include larger inductors 220 coupled with the transmitter driver 210 to help achieve certain power characteristics, implementing the larger inductors 220 on the die can involve using large amounts of chip area, which can be expensive or otherwise undesirable. Some embodiments described herein implement on-die inductors 220, which overlap a large area of signal bumps with a single inductor and with a balanced differential pair (i.e., inductor 220a and inductor 220b). Some implementations further optimize the inductor 220 within its circuit context to reduce the size of the inductor 220.

Embodiments of the serializer subsystem 240 generally receive parallel digital data from components of the IC and output a high-speed, analog, serialized data stream. As illustrated, a digital interface 246 receives the data and outputs weighted digital samples. Data select logic 248 receives the samples and outputs a data stream having four bits per four clock unit intervals (UIs). A serializer 250 and a re-timer 252 can effectively convert the data stream into two bits per two UI clocked with a full-rate clock 238. For example, data can be received by the transmitter system 200 (i.e., at the taps 242, 244) at a rate that is approximately half the data rate of the high-speed channel (e.g., or another suitable fraction thereof) in accordance with a clocking signal running at a corresponding speed. As described below, the transmitter system 200 can include components for converting that clock into a full-speed (e.g., 2×) clock to support the full data rate of the output data channel, as described below. Unlike conventional transmitter systems, the pre-driver and driver stages of the transmitter system 200 described herein can operate at full-rate. A pre-driver logic block 254 can effectively output parallel streams to slices of the transmitter driver subsystem 210. The output from the pre-driver logic block 254 can effectively tune each slice for desired impedance matching (e.g., to provide a 50-ohm output). Some implementations can also weight each slice according to some settable value (e.g., illustrated as rtrim 256).

As described above, a function of the transmitter system 200 is to prepare data for transmission over a high-speed data channel. Preparing the data can involve adapting to certain channel response characteristics using one or more filters, which can distort the amplitude and/or phase of the signals traversing the channel. For example, a finite impulse response (FIR) filter, or other feed-forward filter, can be used to estimate impulse (or pulse) response characteristics of the channel and adapt data transmission, accordingly. Such functionality is shown as part of the serializer subsystem 240.

In general, a feed-forward filter seeks to estimate pulse or impulse characteristics of the data channel and to adjust one or more weights to compensate for those channel characteristics in a manner that approximates an ideal channel response. Typically, the filter obtains one or more samples of the incoming parallel data stream. A particular-time sample, h(0) can be referred to as the cursor; the immediately preceding sample, h(−1), can be referred to as the pre-cursor; the immediately subsequent sample, h(+1), can be referred to as the post-cursor; etc. Each sample can be received at a different input and can be weighted by an adjustable value of a corresponding tap 242. As illustrated, the taps 242 include cursor, pre-cursor, and post-cursor taps 242. Other implementations can include more or fewer taps 242.

In theory, a higher-order filter (i.e., with more adjustable taps 242) can approximate the ideal channel response with more fidelity; such that significantly increasing the number of taps can significantly increase the adaptation performance of the filter. Further, adding particular taps can appreciably improve the channel adaptation provided by the filter, so long as the additional taps are of the proper type. As one example, a channel may benefit from a pre-cursor tap weight that exceeds the range of values that can be applied to the tap 242; such that an additional pre-cursor tap (i.e., the filter would have two pre-cursor taps) would likely improve the adaptation. As another example, when a channel manifests a response with a long tail, filter adaptation may be improved by adding a tap for the post-post-cursor, h(+2). However, implementing additional taps can increase the power and area of the filter circuit, and both the power and area are typically highly constrained in the transmitter system 200 design. As illustrated, embodiments can include one or more floating taps 244. Each floating tap 244 can be converted (e.g., dynamically) into one of multiple types of tap. For example, in the preceding examples, a single floating tap 244 can be converted to a pre-cursor tap to address the first example and to a post-post-cursor tap to address the second example.

As described above, components of the transmitter system 200 operate based on a transmitter clock subsystem 230. In some embodiments, the transmitter clock subsystem 230 is implemented as a multi-phase clock, which can help improve clock performance. Some implementations further include phased-clock error detection and correction. Examples of such a phased-clock implantation with phased-clock error correction are described in U.S. patent application Ser. No. 15/012,518, filed Feb. 1, 2016, titled "Phased Clock Error Handling," which is hereby incorporated by reference in its entirety. As illustrated, some implementations include a quadrature clock with quadrature error (QE) detection and correction. Other implementations can include other types of clocks, such as a two-phase clock. For example, the illustrated transmitter clock subsystem 230 can receive clocking signals in quadrature (i.e., at 0, 90, 180, and 270 degrees) running at approximately half the speed of the high-speed data channel, and can include components for converting the received clocking signals into a double-speed output to effectively support the full rate of the high-speed data channel.

Figure 3:
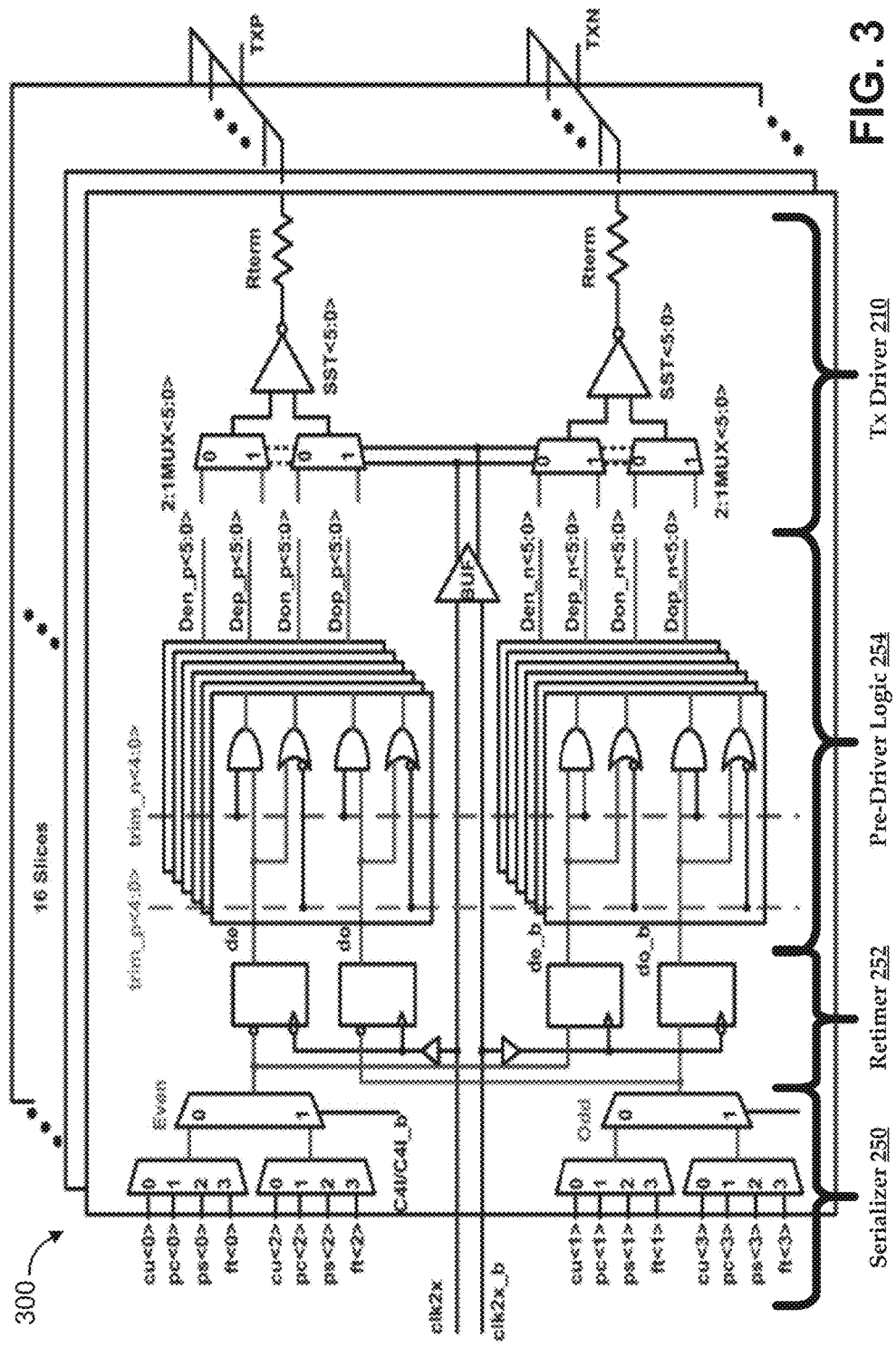
FIG. 3 shows a circuit diagram of an illustrative partial transmitter system that represents a filter data path to the transmitter output, according to various embodiments.

FIG. 3 shows a circuit diagram of an illustrative partial transmitter system 300 that represents a filter data path to the transmitter output, according to various embodiments. The partial transmitter system 300 includes example implementations of the serializer 250, re-timer 252, pre-driver logic 254, and transmitter driver subsystem 210 of FIG. 2. As illustrated, the serializer 250 receives four taps (cursor, pre-cursor, post-cursor, and floating) on each of two pairs of 4-to-1 serializer multiplexers, each pair of multiplexers passing its outputs to a respective 2-to-1 serializer multiplexer. In the illustrated differential architecture, one set of serializer multiplexers (i.e., a pair of 4-to-1 serializer multiplexers and a 2-to-1 serializer multiplexer) is associated with a positive-side transmitter (TXP) data path, and the other set of serializer multiplexers is associated with a negative-side transmitter (TXN) data path. The sets of multiplexers can effectively convert four bits per four clock unit intervals into two times two bits per four clock unit intervals. As illustrated, one 2-to-1 serializer multiplexer can be designated as outputting an even bit stream, and the other 2-to-1 serializer multiplexer can be designated as outputting an odd bit stream.

The re-timer 252 includes two pairs of flip-flops (i.e., four flip flops). A first pair of flip-flops is in the TXP data path; one of that pair has the complement of the even bit stream as its input; and the other of that pair has the complement of the odd bit stream as its input. A second pair of flip-flops is in the TXN data path; one of that pair has the even bit stream as its input; and the other of that pair has the odd bit stream as its input. All the flip-flops are clocked with a full-rate clock, such that the output of the re-timer 252 is effectively two bits per two clock unit intervals.

Notably, conventional SST driver architectures tend to include a clocked multiplexer as part of the output driver. This can effectively couple multiplexer charge sharing with the driver output, which can increase noise sensitivity, frustrate impedance trimming, and/or otherwise reduce performance of the driver. In the illustrated embodiments, the re-timer 252 moves the clocking in front of the pre-driver logic 254, such that both the pre-driver logic 254 and the transmitter driver subsystem 210 can operate at full rate, and impedance control tends to be improved (e.g., multiplex charge sharing glitches can be filtered out by the pre-driver logic 254).

As illustrated, the pre-driver logic 254 can include a number of slices, each configured to drive a respective slice of the transmitter driver subsystem 210. Each slice of the pre-driver logic 254 can include CMOS components that effectively convert the even and odd data streams into rail-to-rail data. Further, trimming inputs (e.g., a trimming code having a positive trim and a negative trim value) can be used to set the output impedance of each pre-driver logic 254 slice, as desired. For example, each pre-driver logic 254 slice can have an output impedance of 50 ohms to match the trace impedance for the integrated circuit. As illustrated, some implementations of the pre-driver logic 254 include a first set of slices associated with the TXP data path, and a second set of slices associated with the TXN data path. Each slice in each set can output a set of pre-driver outputs. As illustrated, for example, each slice in the TXP data path can output four pre-driver outputs, including an even-negative output, an even-positive output, an odd-negative output, and an odd-positive output.

The pre-driver logic 254 can be coupled with the transmitter driver subsystem 210. For example, each pre-driver logic 254 slice in the TXP data path can be an input to a respective TXP slice of the transmitter driver subsystem 210; and each pre-driver logic 254 slice in the TXN data path can be an input to a respective TXN slice of the transmitter driver subsystem 210. For example, the illustrated four outputs of each slice of the pre-driver logic 254 in the TXP data path can be received by a respective pair of 2-to-1 driver multiplexers in the transmitter driver subsystem 210. The pair of 2-to-1 driver multiplexers can be clocked according to the full-rate clock, such that the SST portion of the transmitter driver subsystem 210 can output a data stream at one bit per one clock unit interval.

Figure 4:
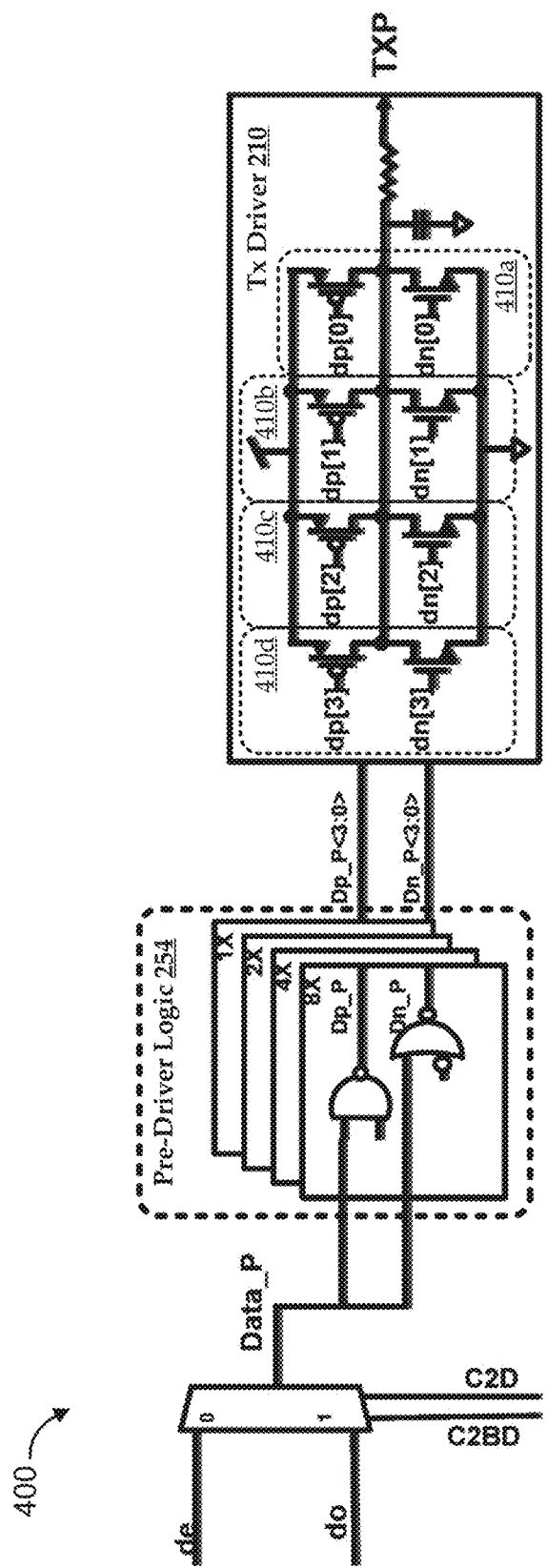
FIG. 4 shows a simplified circuit diagram of an illustrative portion of a transmitter system, according to various embodiments.

FIG. 4 shows a simplified circuit diagram of an illustrative portion 400 of a transmitter system, according to various embodiments. For the sake of simplicity, only the TXP data stream is shown. The circuit of FIG. 4 is similar to corresponding portions of FIG. 3, but with certain differences. One such differences is that, in the embodiment of FIG. 4, the 2-to-1 driver multiplexer is moved in front of the pre-driver logic 254. As described above, it can be desirable to move the 2-to-1 driver multiplexer in front of the transmitter driver subsystem 210; and here, it is further moved in front of the pre-driver logic 254. Another such difference is that the illustrated pre-driver logic 254 has only four slices (e.g., 1×, 2×, 4×, and 8× slices). Each of the four pairs of pre-driver outputs from the four pre-driver logic 254 slices is coupled with a pair of inputs to a respective one of four inverter 410. Each of the four inverters 410 performs as a slice of the transmitter driver subsystem 210. The inverters are coupled with each other in parallel, and the sources of the inverter transistors are all coupled in series with a resistor to form the SST driver architecture. Additional components (e.g., a capacitor coupled between the sources and ground) can also be included. As described above, the TXP output can be coupled with a data channel via an inverter, an I/O interface, etc.

Figure 5:
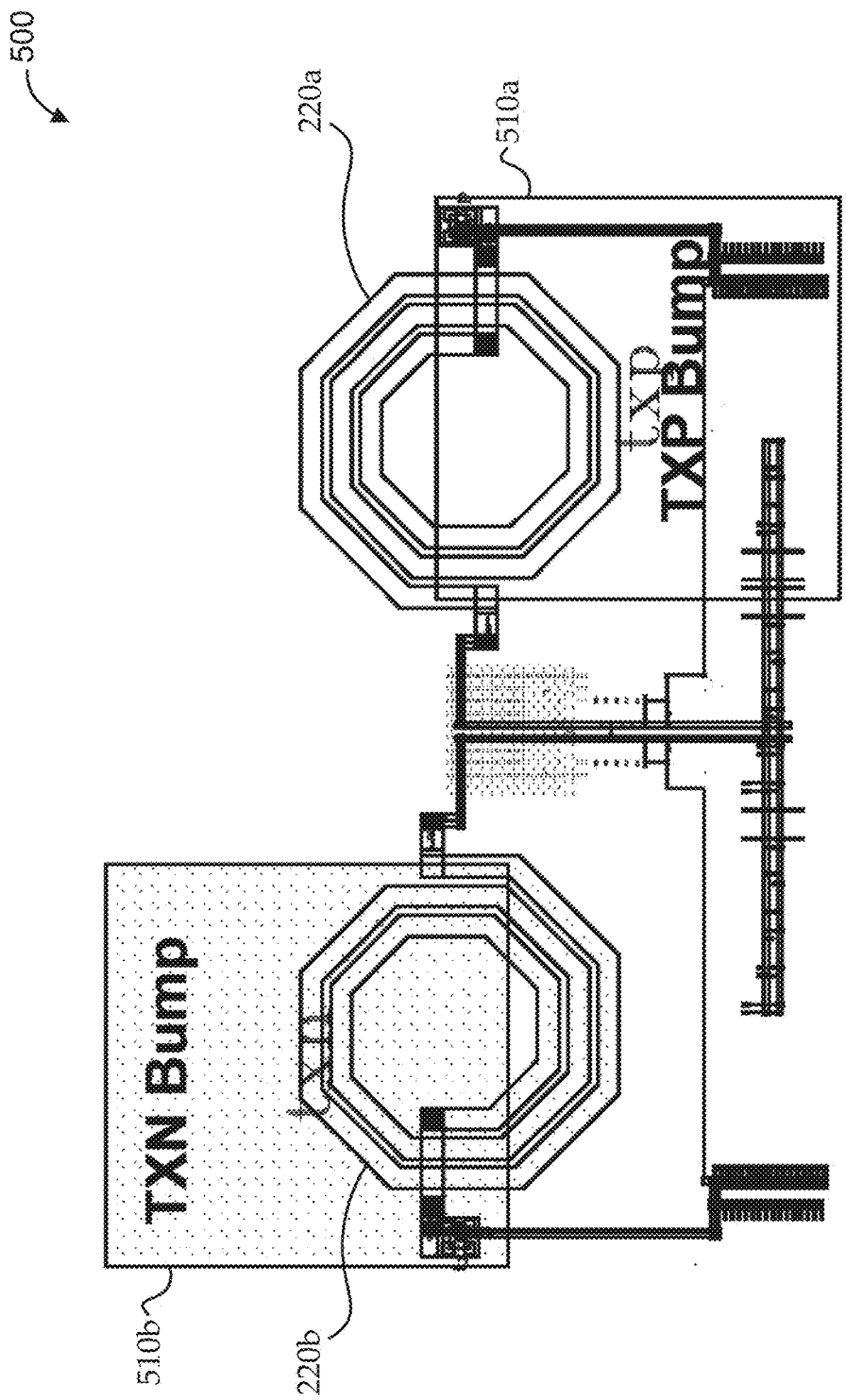
FIG. 5 shows an illustrative inductor layout, according to various embodiments.

As described above, each SERDES transmitter output path (e.g., the TXP and TXN paths in a differential implementation) can include a relatively large inductor. The inductor can help improve bandwidth and return loss, but it can also consume appreciable area on the die of the integrated circuit. FIG. 5 shows an illustrative inductor layout 500, according to various embodiments. As illustrated, a first inductor 220a associated with the TXP output data path can be implemented to overlap a TXP bump 510a associated with a TXP output interface (e.g., output pin), and a second inductor 220b associated with the TXN output data path can be implemented to overlap a TXN bump 510b associated with a TXN output interface. Overlapping the inductors 220 with the bumps 510 can appreciably reduce the additional area otherwise (e.g., conventionally) consumed by the inductors 220.

In one implementation, each inductor 220 is implemented using a five-micron-wide trace. Each inductor 220 has approximately three turns, each turn extending inwards by approximately a half-turn, with an outer radius of approximately 21 microns. Each inductor is implemented in a single-inductor configuration (e.g., as opposed to a T-coil implementation, or the like). Embodiments of the inductors 220 are designed to support a data rate of at least 28 Gigabits per second with not-return-to-zero (NRZ) data, or at least 56 Gigabits per second with four-level pulse-amplitude modulation (PAM-4) data, with a bandwidth of at least 14 Gigahertz.

Figure 6:
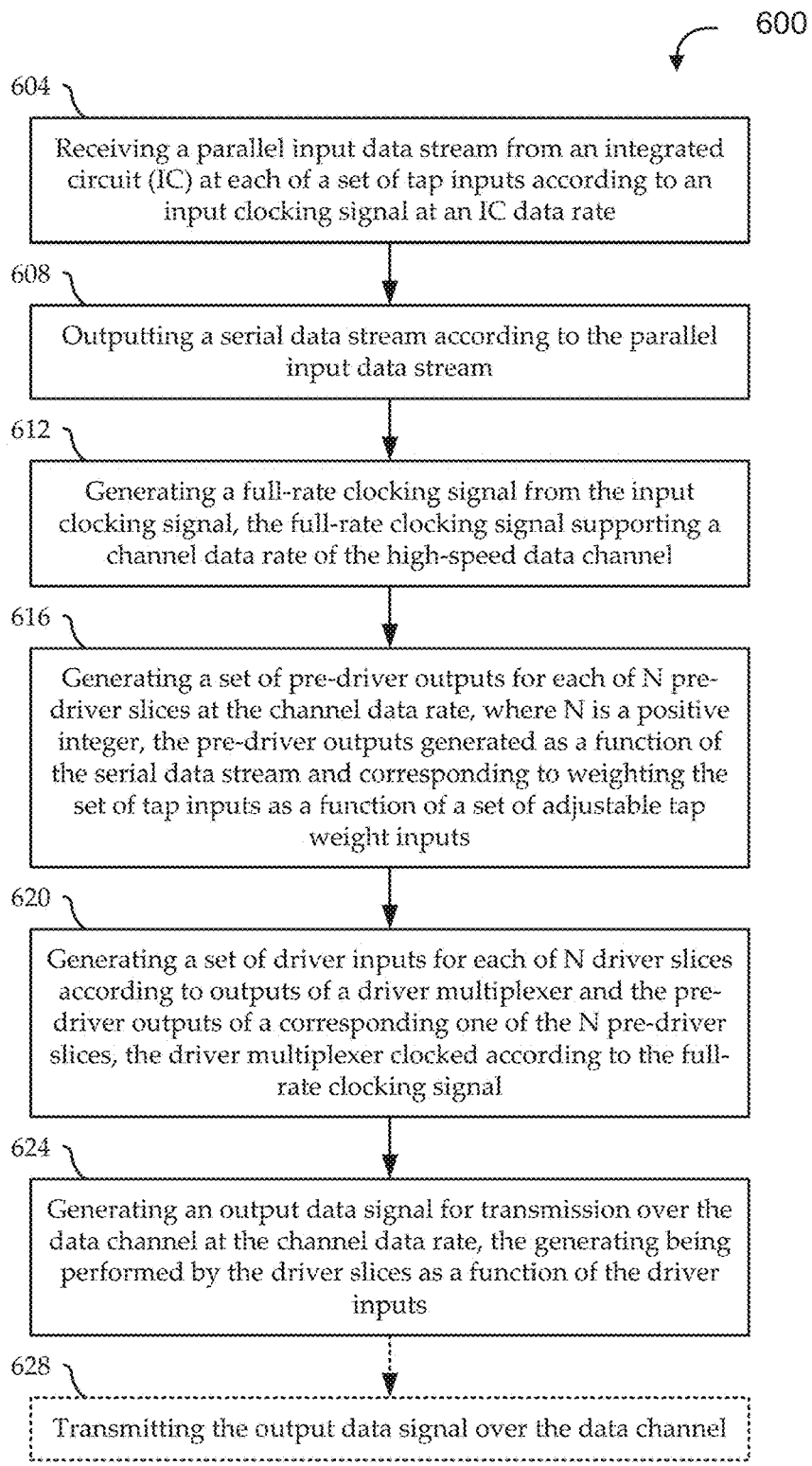
FIG. 6 shows a flow diagram of an illustrative method for transmitting data over a high-speed data channel, according to various embodiments.

FIG. 6 shows a flow diagram of an illustrative method 600 for transmitting data over a high-speed data channel, according to various embodiments. Embodiments of the method 600 begin at stage 604 by receiving a parallel input data stream from an integrated circuit (IC) at each of a set of tap inputs according to an input clocking signal at an IC data rate. At stage 608, embodiments can output a serial data stream according to the parallel input data stream. At stage 612, embodiments can generate a full-rate clocking signal from the input clocking signal, the full-rate clocking signal supporting a channel data rate of the high-speed data channel. At stage 616, embodiments can generate a set of pre-driver outputs for each of N pre-driver slices at the channel data rate, where N is a positive integer, the pre-driver outputs generated as a function of the serial data stream and corresponding to weighting the set of tap inputs as a function of a set of adjustable tap weight inputs. At stage 620, embodiments can generate a set of driver inputs for each of N driver slices according to outputs of a driver multiplexer and the pre-driver outputs of a corresponding one of the N pre-driver slices, the driver multiplexer clocked according to the full-rate clocking signal. At stage 624, embodiments can generate an output data signal for transmission over the data channel at the channel data rate, the generating being performed by the driver slices as a function of the driver inputs. In some embodiments, at stage 628, the output data signal can be transmitted over the data channel.

The methods disclosed herein include one or more actions for achieving the described method. The method and/or actions may be interchanged with one another without departing from the scope of the claims. In other words, unless a specific order of actions is specified, the order and/or use of specific actions may be modified without departing from the scope of the claims.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for transmitting data over a high-speed data channel, the system comprising:
   a serializer/deserializer (SERDES) transmitter system comprising:
      a serializer subsystem to receive a parallel input data stream from an integrated circuit (IC) at each of a set of tap inputs according to an input clocking signal at an IC data rate, the parallel digital interface subsystem further to output a serial data stream;
      a clocking subsystem to generate a full-rate clocking signal from the input clocking signal, the full-rate clocking signal supporting a channel data rate of the high-speed data channel;
      a pre-driver logic subsystem to generate a set of pre-driver outputs for each of N pre-driver slices at the channel data rate, where N is a positive integer, the pre-driver outputs generated as a function of the serial data stream and corresponding to weighting the set of tap inputs as a function of a set of adjustable tap weight inputs; and
      a transmitter driver subsystem coupled with the pre-driver logic subsystem to generate an output data signal for transmission over the data channel at the channel data rate, the transmitter driver subsystem comprising a plurality of driver multiplexers and N driver slices, the driver multiplexer clocked according to the full-rate clocking signal, each driver slice having a set of driver inputs generated according to outputs of the driver multiplexer and the pre-driver outputs of a corresponding one of the N pre-driver slices.

2. The system of claim 1, wherein:
   each driver slice comprises an instance of the driver multiplexer; and
   each instance of the driver multiplexer is coupled between a respective one of the sets of pre-driver outputs and a respective one of the sets of driver inputs.

3. The system of claim 1, wherein the driver multiplexer is coupled in front of the pre-driver logic subsystem, such that the pre-driver outputs are generated according to the outputs of the driver multiplexer.

4. The system of claim 1, wherein:
   the set of tap inputs comprises a floating tap input that programmable to a plurality of tap modes; and
   one of the set of adjustable tap weight inputs corresponds to the floating tap input.

5. The system of claim 1, wherein the set of tap inputs comprises a cursor tap input, a pre-cursor tap input, and a post-cursor tap input.

6. The system of claim 1, wherein the IC data rate is a fraction of the channel data rate.

7. The transmitter system of claim 1, wherein the clocking subsystem comprises a quadrature clock having quadrature error correction.

8. The system of claim 1, wherein the pre-driver outputs are generated further according to a trim input, such that the pre-driver outputs are impedance-matched to a trace impedance of the IC.

9. The system of claim 1, wherein N is 16.

10. The system of claim 1, wherein the transmitter driver subsystem is a source-series-terminated (SST) driver, each driver slice comprising an inverter having inputs coupled with corresponding pre-driver outputs.

11. The system of claim 1, wherein the SERDES transmitter system further comprises:
   an inverter coupled between the transmitter driver subsystem and the high-speed data channel, the inverter disposed to partially overlap an output bump of the IC.

12. The system of claim 11, the output bump being one of a plurality of output bumps, and further comprising:
   an IC substrate;
   a plurality of output interface structures coupled with the IC substrate, each output interface structure coupled with respective one of the output bumps disposed on the IC substrate,
   the SERDES transmitter system being one instance of a plurality of SERDES transmitter system instances, each having an instance of the inductor coupled with an instance of the transmitter driver and disposed to partially overlap the respective output bump.

13. A method for transmitting data over a high-speed data channel, the method comprising:
   receiving a parallel input data stream from an integrated circuit (IC) at each of a set of tap inputs according to an input clocking signal at an IC data rate;
   outputting a serial data stream according to the parallel input data stream;
   generating a full-rate clocking signal from the input clocking signal, the full-rate clocking signal supporting a channel data rate of the high-speed data channel;
   generating a set of pre-driver outputs for each of N pre-driver slices at the channel data rate, where N is a positive integer, the pre-driver outputs generated as a function of the serial data stream and corresponding to weighting the set of tap inputs as a function of a set of adjustable tap weight inputs;
   generating a set of driver inputs for each of N driver slices according to outputs of a driver multiplexer and the pre-driver outputs of a corresponding one of the N pre-driver slices, the driver multiplexer clocked according to the full-rate clocking signal; and
   generating an output data signal for transmission over the data channel at the channel data rate, the generating being performed by the driver slices as a function of the driver inputs.

14. The method of claim 13, further comprising:
   transmitting the output data signal over the data channel.

15. The method of claim 14, wherein:
   the transmitting is via an inverter coupled between the driver slices and the high-speed data channel, the inverter disposed to partially overlap an output bump of the IC.

16. The method of claim 13, wherein:
   the set of tap inputs comprises a floating tap input that programmable to a plurality of tap modes; and
   one of the set of adjustable tap weight inputs corresponds to the floating tap input.

17. The method of claim 13, wherein generating the full-rate clocking signal comprises:
   receiving the input clocking signal by a quadrature clock;

outputting a quadrature-error-corrected clocking signal from the quadrature clock; and generating the full-rate clocking signal from the quadrature-error-corrected clocking signal.

18. The method of claim 13, wherein generating the set of pre-driver outputs is further according to a trim input, such that the pre-driver outputs are impedance-matched to a trace impedance of the IC.

19. The method of claim 13, wherein the driver slices are source-series-terminated (SST) driver slices.

20. A method for forming a serializer/deserializer (SERDES) transmitter, the method comprising:

disposing a serializer subsystem on a substrate to receive a parallel input data stream from an integrated circuit (IC) at each of a set of tap inputs according to an input clocking signal at an IC data rate, the parallel digital interface subsystem further to output a serial data stream;

disposing a clocking subsystem on the substrate to generate a full-rate clocking signal from the input clocking signal, the full-rate clocking signal supporting a channel data rate of the high-speed data channel;

disposing a pre-driver logic subsystem on the substrate to generate a set of pre-driver outputs for each of N pre-driver slices at the channel data rate, where N is a positive integer, the pre-driver outputs generated as a function of the serial data stream and corresponding to weighting the set of tap inputs as a function of a set of adjustable tap weight inputs;

disposing a transmitter driver subsystem on the substrate to generate an output data signal for transmission over the data channel at the channel data rate, the transmitter driver subsystem comprising a plurality of driver multiplexers and N driver slices, the driver multiplexer clocked according to the full-rate clocking signal, each driver slice having a set of driver inputs generated according to outputs of the driver multiplexer and the pre-driver outputs of a corresponding one of the N pre-driver slices; and disposing an inductor on the substrate such that the inductor partially overlaps an output bump disposed on the substrate, and the inductor is coupled with the transmitter driver subsystem.

* * * * *